(12) United States Patent  
Mori (10) Patent No.: US 6,481,650 B1
(45) Date of Patent: Nov. 19, 2002

(54) METHOD AND APPARATUS FOR CRUSHING WASTE TIRES

(75) Inventor: Seiichi Mori, Toyama (JP)

(73) Assignee: Mori Manufactory Co., Ltd., Toyama (JP)

( * ) Notice: Subject to any disclaimer, the term of this patent is extended or adjusted under 35 U.S.C. 154(b) by 0 days.

(21) Appl. No.: 09/674,804

(22) PCT Filed: Mar. 8, 2000

(86) PCT No.: PCT/JP00/01398

§ 371 (c)(1),
(2), (4) Date: Nov. 7, 2000

(87) PCT Pub. No.: WO00/53323

PCT Pub. Date: Sep. 14, 2000

(30) Foreign Application Priority Data

Mar. 8, 1999 (JP) .......................................... 11/060551
Jul. 5, 1999 (JP) .......................................... 11/190774

(51) Int. Cl.[7] .............................................. B02C 19/12
(52) U.S. Cl. ................................ 241/24.15; 241/24.17; 241/73; 241/242; 241/285.2; 241/DIG. 31
(58) Field of Search ................... 241/73, 242, DIG. 31, 241/294, 285.2, 24.15, 24.17, 30

(56) References Cited

U.S. PATENT DOCUMENTS 3,813,045 A * 5/1974 Greiffenstern ........... 241/285.2
4,657,192 A * 4/1987 Browning .................... 241/73
5,452,860 A * 9/1995 Williams ............. 241/DIG. 31

* cited by examiner

Primary Examiner—Mark Rosenbaum
(74) Attorney, Agent, or Firm—Connolly Bove Lodge & Hutz LLP (57) ABSTRACT

The present invention provides a method and an apparatus for crushing and pulverizing tire chips roughly crushed to a size of 10 cm in length by completely separating to rubber components from iron components in a single crushing process. It is intended to extensively simplify the process to produce rubber powder from waste tires and to promote material recycling of the used tires. The method comprises the steps of catching the tire chips between monoaxial rotary blades 3 rotated within a casing 2 and fixed blades 4 and 4 fixed and arranged at opposed positions and maintaining a gap slightly larger than diameter of a piano wire 9 contained in the tires, rupturing only the rubber components without cutting piano wires and steel fibers, tearing and withdrawing rubber components by rotation of the rotary blade 3, and crushing while separating rubber components from iron components.

6 Claims, 8 Drawing Sheets

METHOD AND APPARATUS FOR CRUSHING WASTE TIRES

TECHNICAL FIELD

The present invention relates to a method and an apparatus for crushing and pulverizing used and waste tires for effective recycling and re-use of rubber materials by separating iron and steel components embedded in the tires such as piano wires and steel fibers.

BACKGROUND ART

Today, as many as about 100 million tires are turned to waste materials as waste or used tires each year in this country. The used tires are stacked high on open space in suburban areas, and these tires not only spoil and hurt the view of the city but may cause disaster by spontaneous ignition and fire. The recycling ratio of the waste tires exceeds now 90%, and this is the best among the industrial waste. As a matter of fact, however, this may not be true. When we investigate the real state of recycling of waste tires in detail, more than one half of the waste tires are burned and used for power generation or for firing of cement. This is, so to speak, a disposal by incineration.

Figure 4:
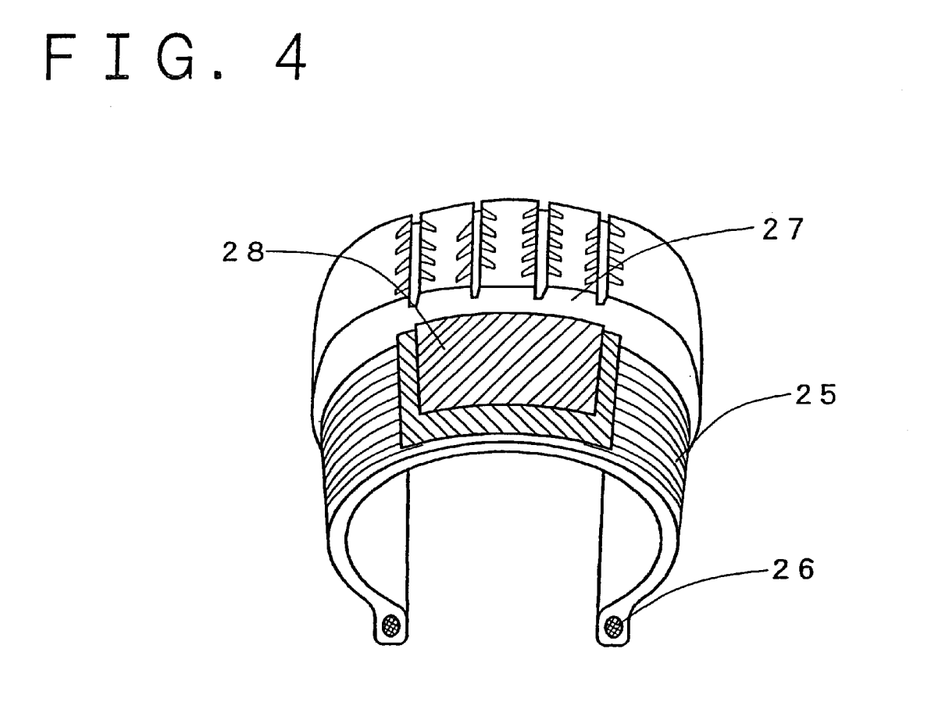
FIG. 4 is a partially cutaway perspective view of internal structure of a radial tire.

The tires and technology on tires have been advancing on the way of evolution, being turned to composite materials of increasingly higher grade in association with the incessant progress of performance characteristics of automobile. FIG. 4 shows the details of inner portion of a radial tire, which is main stream of the tires used at present. Chemical fiber cords such as nylon, polyester, etc. are woven just like a bamboo blind, and by covering both surfaces with rubber, a carcass 25 is formed. This constitutes a skeleton for a tire. Both ends of the carcass 25 to be engaged with rim are wound up on a bead 26, which comprises a bundle of piano wires of about 1 mm in diameter. Between the carcass and a tread 27, i.e. a rubber layer to be in contact with road surface, a cloth-like steel belt 28 woven with very fine steel fibers is buried, and this fastens the carcass and reinforces it just like a hoop on a barrel. As described above, a tire comprises rubber, fibers such as steel, nylon, etc., and piano wires, and these components are integrated with the rubber as adhesive agent. This poses a great obstacle for recycling of the used tires. Above all, it is absolutely necessary to completely separate piano wires and steel fibers from rubber components in a process to produce rubber powder suitable for re-use. For this purpose, crushing, pulverizing, and magnetic separation must be repeatedly performed, and this requires facilities of very large scale.

The rubber powder obtained from waste tires is very useful. It can be used as paving material to prevent the freezing of road surface, and there are many other applications. At present, however, rubber powder is very expensive, being at a price of about 200 yen per kg in case of rectangular chips of about 5 mm in size, and this hinders the utilization for practical use. Apart from discussing whether it is lucky or unlucky, waste tire chips can be used as a fuel of high quality, and it is still firmly believed that the tire chips should be burned in any case. On the other hand, in Europe and America, tires are recycled for two or three times by re-attaching tread rubber. In our country where almost all of the materials are imported, mass consumption of rubber materials are still continued, and this situation should be avoided. We must positively attempt to turn away from thermal utilization of waste tires and must make efforts toward the material recycling by utilizing the excellent property of the rubber components.

At present, for the purpose of crushing and pulverizing tires, biaxial shearing type crushing and monoaxial impact type pulverizer are used. In both cases, biaxial rotary blades with sharp edges or rotary blades and fixed blades are used. The gap between the blade edges is decreased, normally to about 0.1 mm, and by relative movement of blade edges, tires are crushed and ruptured together with rubber, piano wires, and steel belt. In this process, it has been an important problem how long the sharpness of the blade edges can be maintained, or whether the blade can be easily replaced or not when blade edges are worn out. After passing through this process, the tires are crushed and pulverized to small pieces. There are usually iron components buried in the rubber components and these are often difficult to separate by means of magnet, and it is normally not possible to completely remove iron components when the crushed tires are passed through a magnetic separator only once. In this respect, magnetic separation process must be performed two or three times, while the tire chips are crushed and pulverized stepwise.

DISCLOSURE OF THE INVENTION

It is an object of the present invention to provide a method and an apparatus for crushing and pulverizing waste tire chips roughly crushed into pieces each in size of 10 cm on each side so that rubber components and iron components can be completely separated in a single crushing process, thereby extensively simplifying the process to produce rubber powder from waste tires and promoting material recycling of the waste tires.

To overcome the above problems, the method for crushing waste tires according to the present invention comprises the steps of catching waste tire chips between monoaxial rotary blades rotating within a casing and fixed blades fixed at opposed positions and maintaining a small gap slightly larger than diameter of a piano wire contained in the tires, rupturing only rubber components without cutting the piano wires and steel fibers, tearing and separating the rubber components by rotation of the rotary blades, and crushing the tires while separating the rubber components from iron components.

Also, the present invention provides an apparatus for crushing waste tires, horizontally supported at approximately central position in a casing communicated with a hopper, and comprising rotary blades rotated by a motor, fixed blades, and a filter, the fixed blades being fixed and maintaining a gap slightly larger than diameter of a piano wire contained in the tire between edges of the fixed blades and edges of the rotary blades, and the filter designed in curved shape along edges of the rotary blades and being placed on lower surface of the casing and provided with a multitude of punching holes.

Even when edges of the rotary blades and the fixed blades are not very sharp, it would be more convenient because such edges are effective enough to rupture rubber components while it is difficult to cut piano wires by these edges. The edges of the blades are used not to cut the piano wires but to apply local and strong pressure on the rubber components and separate them. Without replacing or re-grinding the edges which are worn out very slowly, stable crushing and separating effects can be obtained for long time. The gap between the edges of the blades is designed by 1.1 to 1.8 times larger than the diameter of the piano wire contained in the tire, or more preferably, by 1.2 to 1.5 times. The temperature inside the casing is increased to 50° C.–60° C. due to the friction between the tire chips themselves and also to the friction between the tire chips and the rotary blades. Rubber is softened, and this facilitates the withdrawal and the separation of the piano wires.

When seen from long-term viewpoint, it is not that edges of the rotary blades are not worn out at all. In this respect, edge portion may be produced separately and by fixing this using bolt, the edge portion may be replaced when necessary. For further improvement of performance characteristics of the apparatus for crushing the waste tires of the present invention, the following two modes of improvement were added with respect to the form of edges of removable type tool tip and a method to fix the tool tip to the rotary blade main body.

The first improvement is that the tool tip is disposed obliquely to have a twist angle with respect to longitudinal direction of the rotation shaft. There is no need to set the twist angle to an angle not so large, but about 5 degrees would be all right. By designing in such manner, when the tire chips are caught between the rotary blades and the fixed blades, edges of the rotary blades are applied obliquely. As a result, tire chips are cracked from the ends and are sequentially ruptured. Thus, tire chips can be ruptured steadily and smoothly by applying very slight force. Then, wearing of the edges advances more slowly, and the shock is reduced. As a result, noise is also decreased.

The second improvement is to utilize bearing pressure of the holding piece formed in wedge-like shape to fix the tool tip on the rotary blade main body. When designed in such manner, there is no need to form mounting holes on the tool tip, and this leads to cost reduction. Also, the tool tip can be removed or inserted by slightly loosening all of the bolts for mounting the holding piece, and this facilitates the replacement of the tool tip.

The size of punching holes of the filter is directly related to the degree or the level of crushing. If it is set to a larger value, the time required for crushing will be shorter, and it will be coarse crushing. On the contrary, if it is set to a smaller value, longer time is required for crushing, but crushing to finer particles can be achieved. In this respect, it is preferable to prepare different types of filters with punching holes of different sizes so that each different type of filter can be used for each different purpose. The larger the apparatus is designed, the longer time is required for the replacement of the filter.

That is, the present invention provides an apparatus for crushing waste tires as described above, wherein the filter is supported by a pair of clamp arms opened in downward direction by cylinders from the lower side, a carriage moving along two rails is provided in lower portion of the casing, and the carriage comprises a chute for charging crushed materials falling from the filter to the subsequent process, and a lifter for receiving the filter turned to free state and for moving the filter up and down, and the chute and the lifter being arranged at aligned positions.

In this structure, means such as bolts are not used to fix the filter, and the filter is turned to free state by opening the clamp arms. If the carriage is moved so that the lifter comes to a position right under the filter and the pawls of the lifter are engaged with the lower surface of the filter, the filter in free state can be received and can be moved down. Then, the carriage is moved again and the filter can be replaced with the other type of filter at a position where there is no obstacle above the filter. When the filter is to be mounted, the above procedure can be reversed. According to this structure, the replacement of the filter, which usually required half a day in the past may be finished within 10 minutes.

According to the method for crushing waste tires of the present invention, waste tire chips of 10 cm in size can be turned to fine particles of less than 1 mm or to rubber chips of several mm in size by a single crushing process. Also, piano wires and steel fibers buried in the tires can be exposed to outside. Then, it is possible to remove iron components completely through a single magnetic separation process. Rubber powder thus obtained has particle size of less than 1 mm to several mm. Using different types of screens stepwise, rubber powder of uniform particle size can be collected. In particular, fine rubber particles are often lost through several processes of crushing and magnetic separation in the conventional apparatus and cannot be produced except by freeze-crushing. Hence, the fine rubber powder is very expensive. By the apparatus of the present invention, only the fine powder can be selected by screening after it passes through the filter and can be collected in easier manner.

BEST MODE FOR CARRYING OUT THE INVENTION

Figure 1:
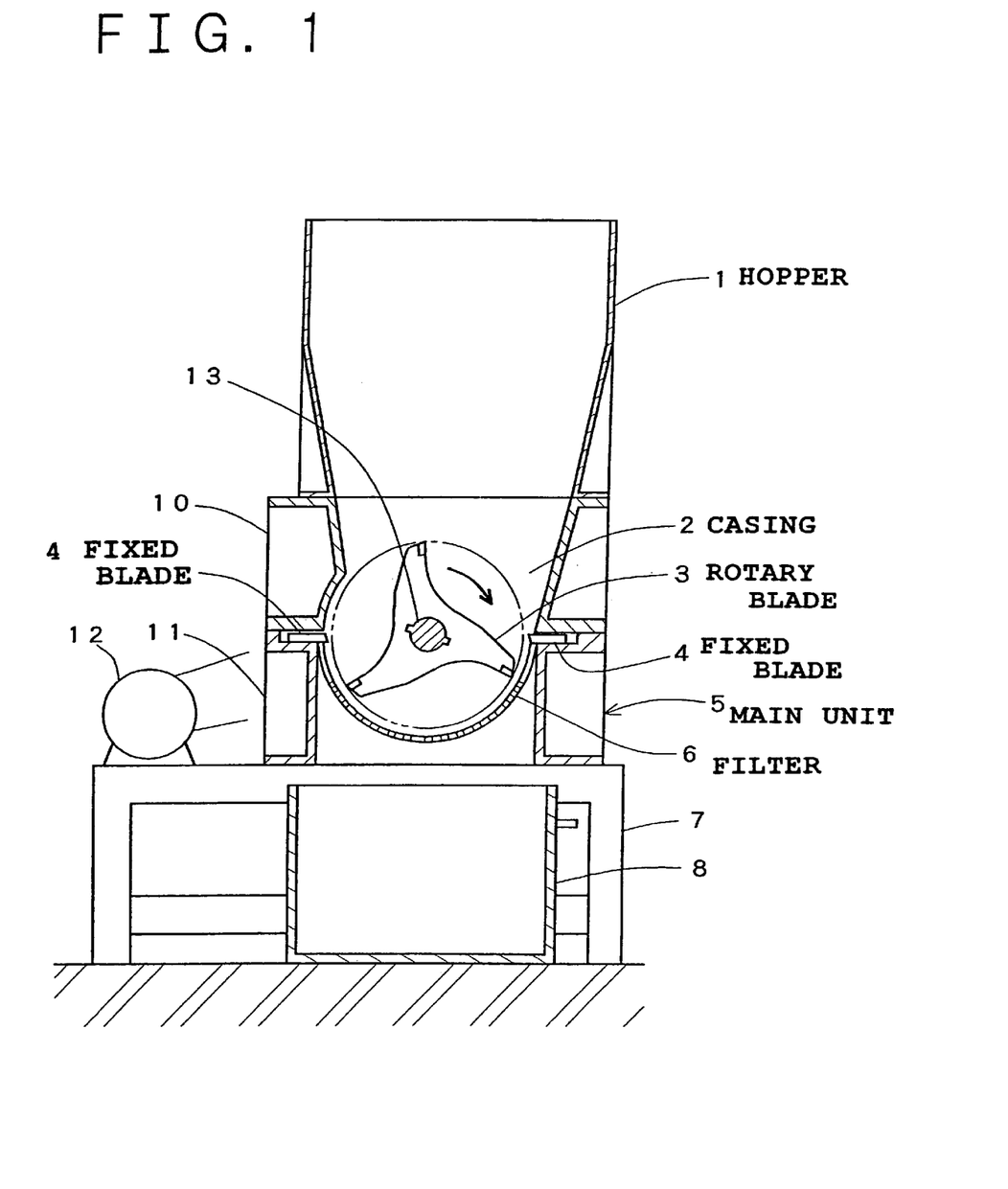
FIG. 1 is a cross-sectional view showing a crushing apparatus according to the present invention.
Figure 2:
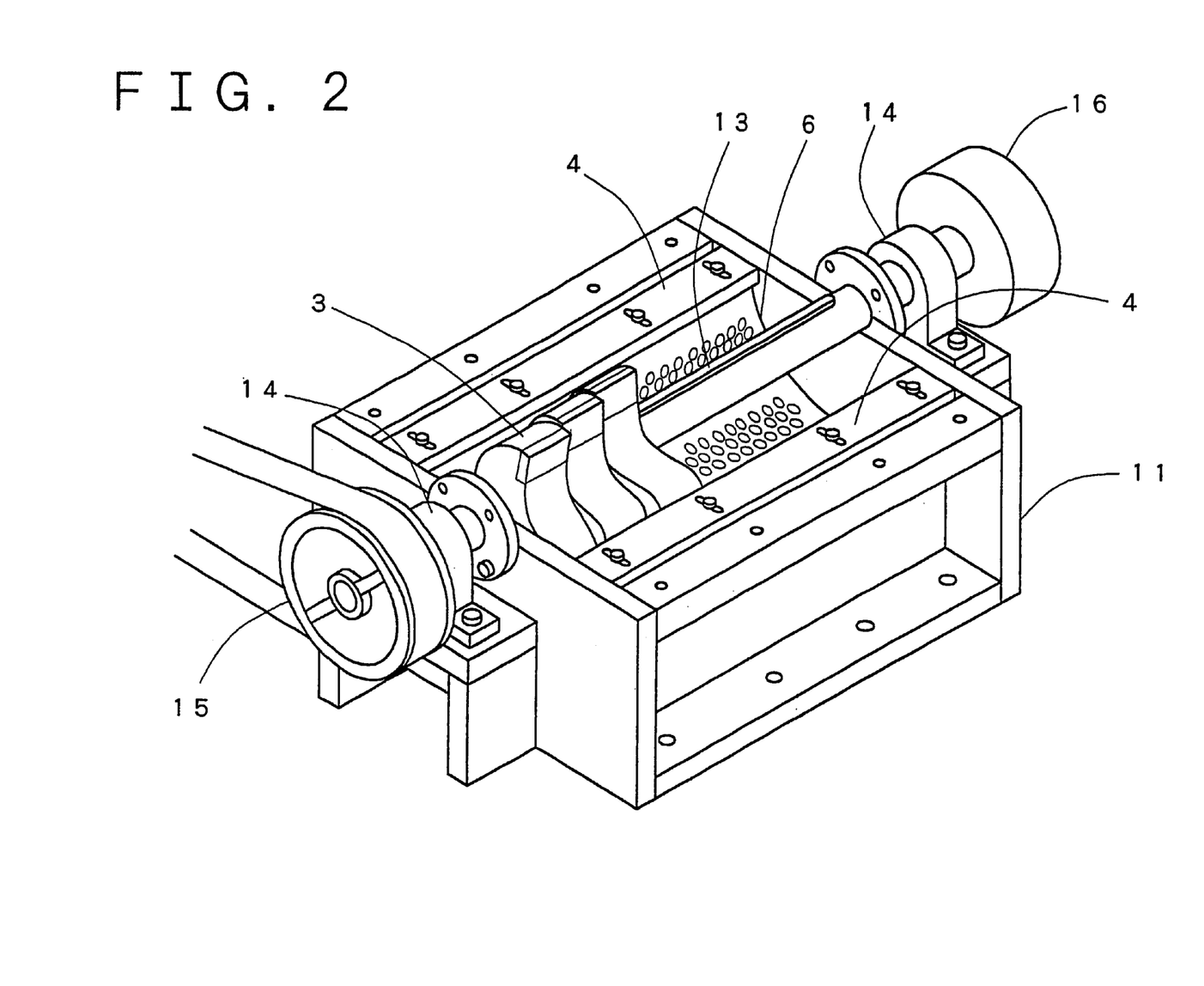
FIG. 2 is a perspective view showing an essential portion of the crushing apparatus according to the present invention.

Detailed description will be given below on the apparatus for crushing waste tires according to the present invention referring to the drawings. FIG. 1 is a cross-sectional view of the crushing apparatus, and FIG. 2 is a perspective view showing an essential portion of the apparatus. The crushing apparatus comprises a hopper 1, into which chips of used and waste tires are charged, a main unit 5 provided with a rotary blade 3 for mixing and crushing tire chips in a casing 2 which is communicated with an outlet of the hopper, and a base 7 where these components are mounted.

The rotary blade 3 comprises a cutter base in approximately triangular shape and made of thick plate, and several pieces of brazed cemented carbide cutting chips are fixed at each of three apexes of the cutter base so that the phases of adjacent blade edges are slightly deviated from each other. The rotary blade is divided as described above for the purpose of dispersing resisting force applied on blade edges. For frame structure of the main unit of the apparatus, various design can be conceived. In the present embodiment, it is designed as a welded structure so that it can be divided to two parts, i.e. an upper main unit frame 10 and a lower main unit frame 11, at axial position of the main shaft 13. This is to facilitate the mounting of the main shaft 13 with the rotary blade 3 to the frame, and also to facilitate the maintenance later. On the lower main unit frame 11, the main shaft 13 is arranged at horizontal position so that it is rotatably supported by a bearing unit 14 on outside of the frame. On one end of the main shaft 13, a pulley is engaged, and it is connected with a motor 12 via a belt. On the other end of the main shaft, a flywheel 16 is mounted. This is not necessarily needed, but it is effective to alleviate the shock caused by intermittent crushing operation by increasing the moment of inertia because this apparatus is usually started and stopped not very frequently.

Two fixed blades 4 and 4 are disposed approximately on the same level as the axis of the main unit 13 and at opposed positions. These fixed blades are fixed on the frame by bolts so that a certain gap is maintained between each of the fixed blades and the edge of the rotary blade 3. This gap is set to a value by 1.2 to 1.5 times larger than the diameter of a piano wire 9 contained in the waste tire chips, e.g. a gap of about 1.2 mm in case the diameter of the piano wire is 1 mm. Mounting hole of the fixed blade 4 is designed as a slot or an oblong hole to facilitate fine adjustment of the gap. Under the rotary blade 3, a filter made of plate material designed in semicircular shape and having a multitude of punching holes is removably disposed on the frame. The size of each of these punching holes is directly related to the degree or the level of crushing. If the punching holes are too small, much more time is required for crushing. If these holes are too big in size, iron components may not be completely separated. When the size of each of the punching holes is set to about 10 mm in diameter, the time required for crushing of one waste tire is about 10 seconds, and iron components are also completely separated.

Figure 9:
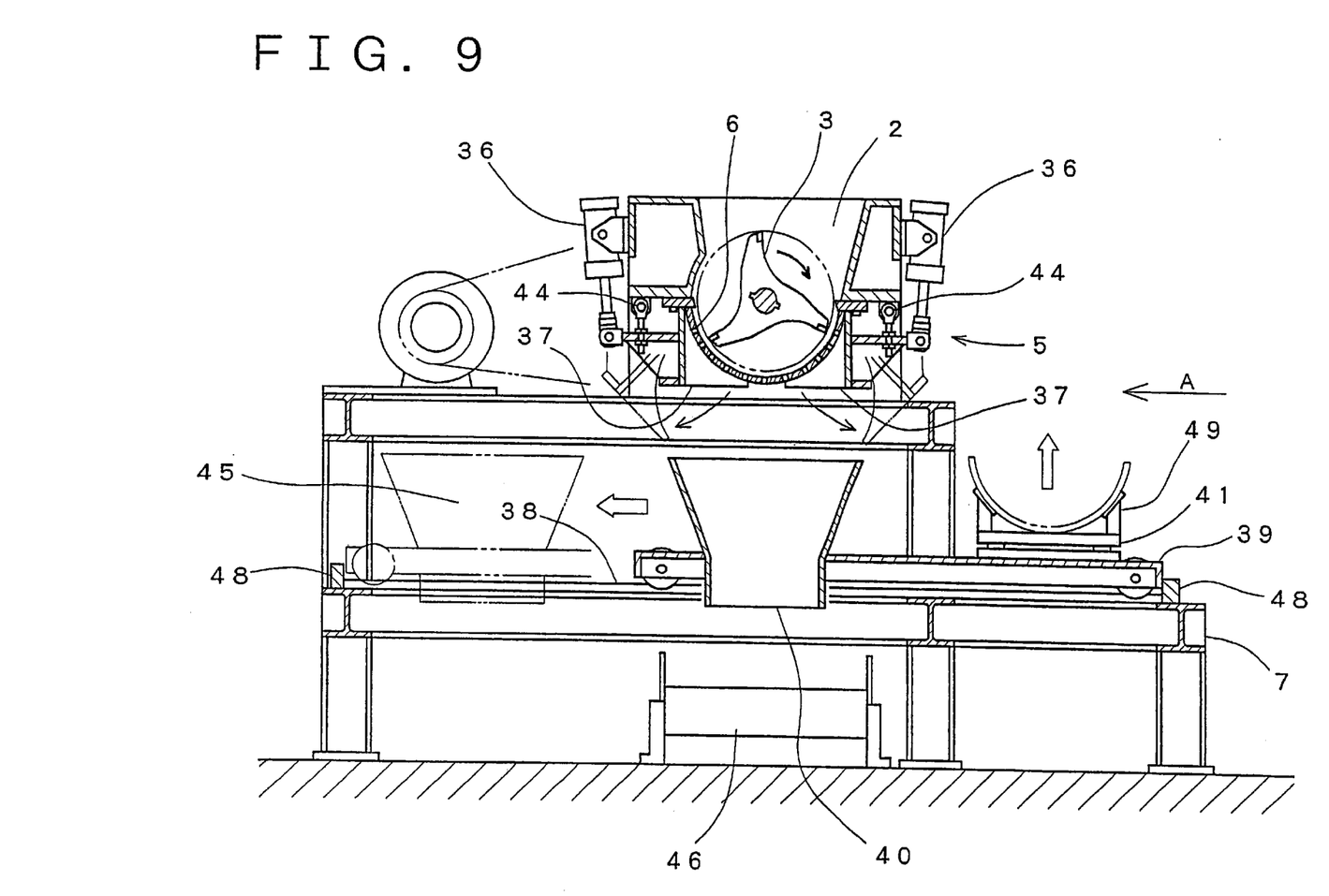
FIG. 9 is a cross-sectional view showing another embodiment of the crushing apparatus of the present invention.
Figure 10:
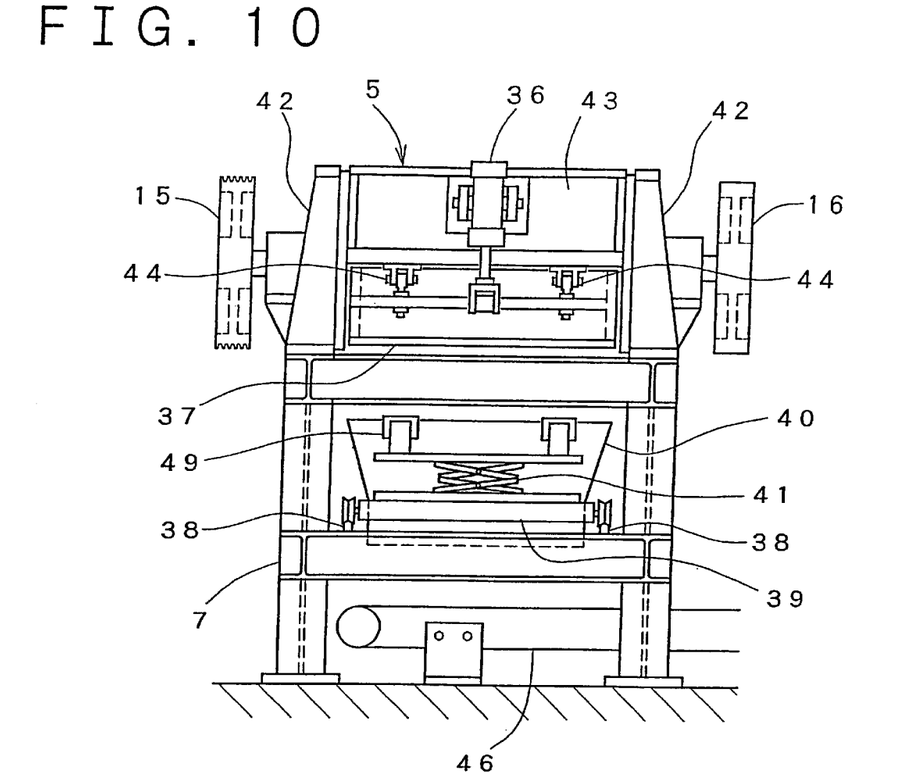
FIG. 10 is an arrow diagram seen in the direction of an arrow A in FIG. 9.
Figure 11:
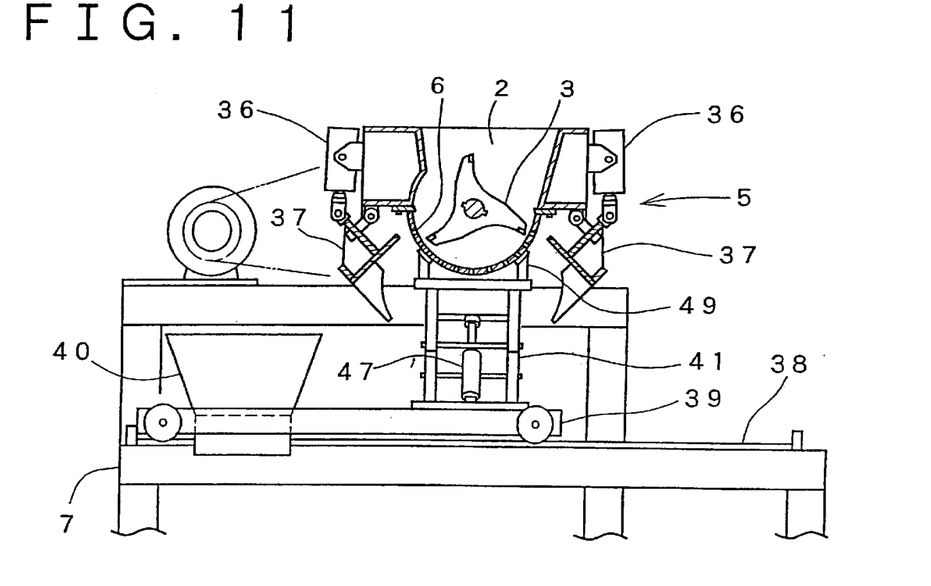
FIG. 11 is a cross-sectional view showing a condition when a filter is replaced in the crushing apparatus of FIG. 9.

However, depending on the application of the rubber powder to be obtained, it may be necessary to crush the tires to finer powder or it may be crushed to coarse powder. In this respect, it is preferable that two or more different types of filters are prepared with punching holes of different sizes, i.e. about 5–30 mm, so that the filter can be replaced with the other type of filter having the holes of different diameters. FIG. 9 to FIG. 11 each represents an embodiment of the invention, in which an improvement is made to replace the filter skillfully within short time.

In this case, the frame of the main unit 5 is designed in form of a gate with side frames 42 and 42 and a central frame 43. On the bottom surface of the central frame 43, clamp arms 37 and 37 to support the filter 6 from below are connected by suspending the arms using pins 44 and 44. A rod of each of cylinders 36 and 36 is connected to the end of each of the clamp arms 37 and 37, and the clamp arms can be opened in downward direction. A base 7 where the main unit 5 is placed is formed in two-storied design using steel materials having H-shaped cross-section. The second floor space 45 is a space to be used for a carriage 39. The carriage 39 is placed on two rails 38 and 38 arranged in parallel to each other on the base 7 and can be moved back and forth by a slight force. Stoppers 48 and 48 are provided as the front and the back limits. The carriage comprises a chute 40 and a lifter 41 for moving the filter 6 up or down. The chute 40 charges the crushed materials falling through the filter 6 to a belt conveyor to convey the crushed materials to the subsequent process such as magnetic separator. The lifter 41 is designed as pantograph type, and it can be automatically moved up and down by a cylinder 47, and pawls to engage with lower surface of the filter is provided on the upper surface of the lifter.

During the crushing operation, the carriage 39 is at such position that the chute 40 is right under the filter 6 as shown in FIG. 9. When the filter 6 is replaced, the carriage 39 is moved leftward so that the lifter 41 comes to a position directly under the filter 6 as shown in FIG. 11. The lifter 41 is moved up, and when the pawls 49 engage with the lower surface of the filter 6, the rods of the cylinders 36 and 36 are retracted to open the clamp arms 37 and 37. Then, the filter 6 is in free state and can be received by the lifter 41. Next, the lifter 41 is moved down and the filter 6 is moved down. Then, the carriage 39 is moved rightward and the filter 6 is replaced at a position where there is no obstacle above. To mount the filter 6 on the main unit, the above procedure should be reversed. As described above, the filter 6 can be skillfully replaced within 10 minutes on this apparatus.

Figure 5:
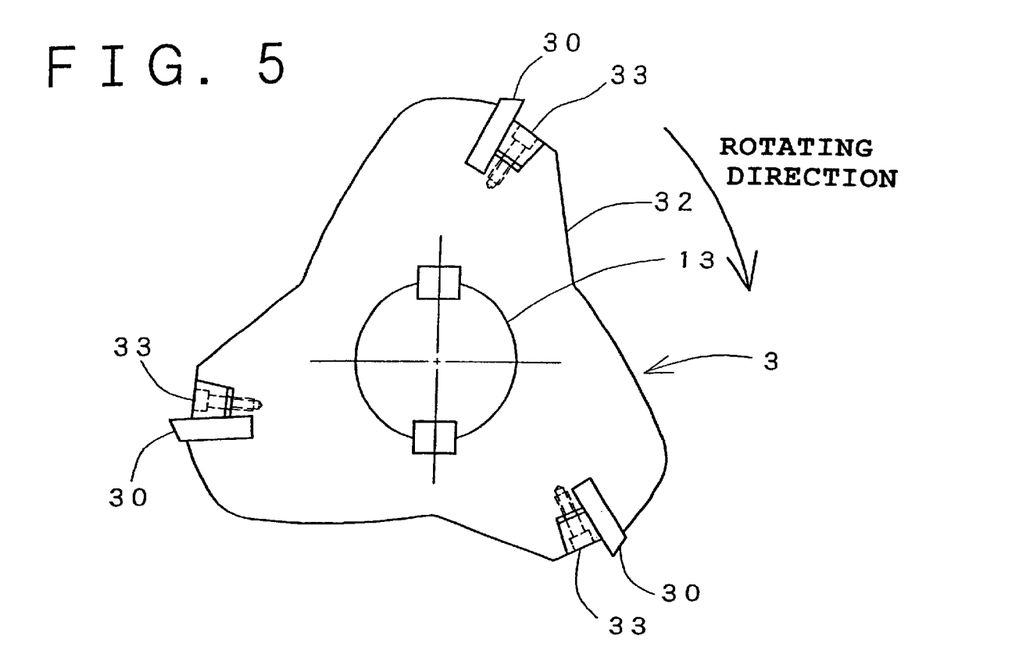
FIG. 5 is a front view of a rotary blade with blade edges removably mounted on it.
Figure 6:
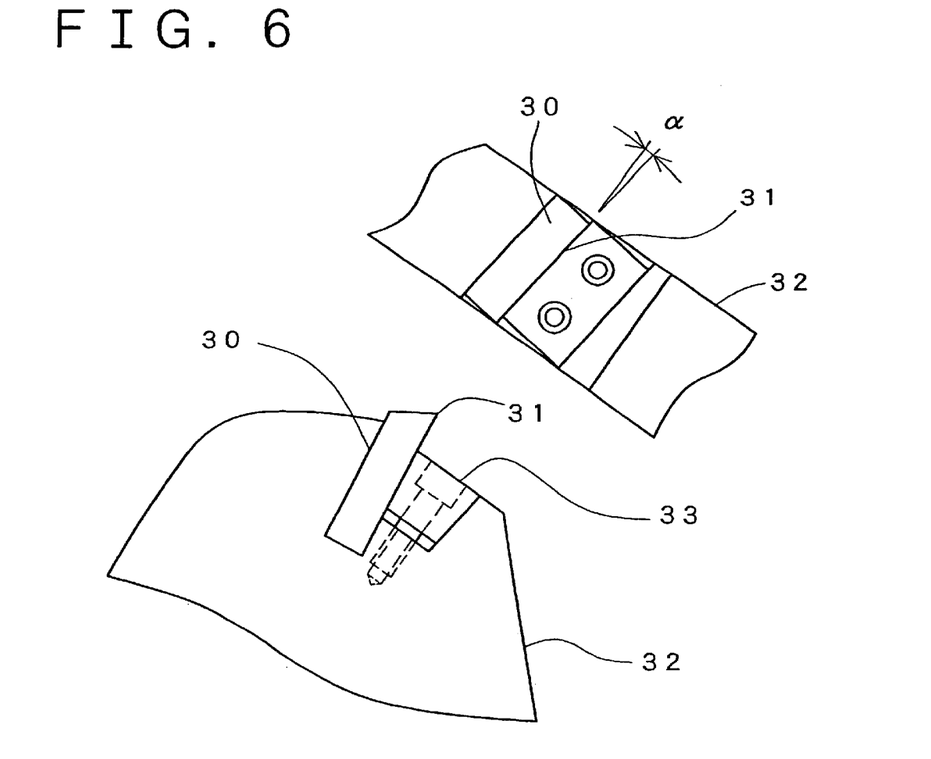
FIG. 6 is a drawing to show the details of an edge of the blade of removable type.
Figure 7:
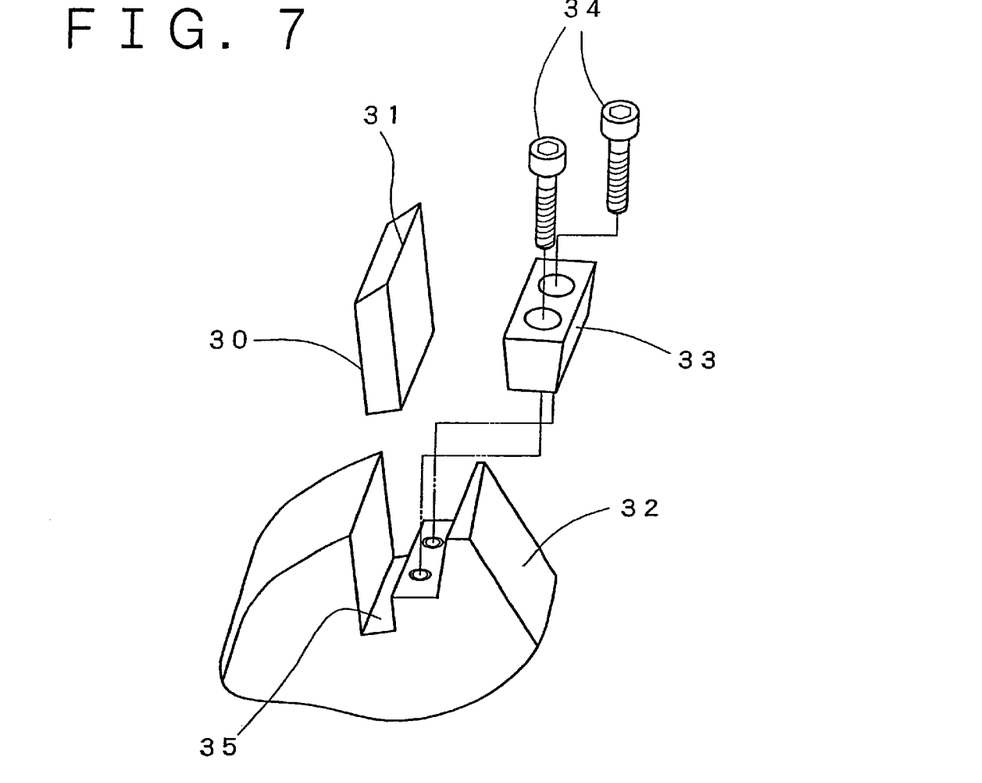
FIG. 7 is an exploded perspective view of the blade edge of removable type.

The edges of the rotary blade 3 may be integrally formed with the rotary blade main body as described in the above embodiments, while it is preferable to design the blade edges as replaceable. FIG. 5 to FIG. 7 each represents an embodiment where the edges are formed as removable type tool tips designed separately from rotary blade main body. In this case, it is important that an edge 31 of the tool tip 30 is not in parallel to longitudinal direction of the main shaft 13 (rotating shaft) but it is mounted on a cutter base 32 obliquely with a twist angle $\alpha$ as shown in FIG. 6. The twist angle $\alpha$ is reasonably about 5 degrees. With such design, resistance and shock caused by crushing operation can be extensively reduced compared in the case where straight edges are used.

One rotary blade 3 comprises a cutter base in triangular shape or in form of a rice ball of about 50 mm in thickness and serving as a base for the blade, three tool tips mounted near each of the apexes of the cutter base, a holding piece 33, and a bolt 34. The tool tip 30 is a rectangular metal piece with its upper surface cut obliquely and quenched. This has no hole for mounting. The tool tips 30 are engaged in a groove 35 formed at an angle equal to the twist angle $\alpha$ in direction of thickness or toward depth, and are arranged one each at three points on the apexes of the cutter base 32. The holding piece 33 to be engaged with the front side of the tool tip 30 is designed in wedge-like shape with trapezoidal cross-section. By fastening the bolt 34, strong bearing pressure to hold the tool tip 30 backward is applied. By this bearing pressure, the tool tip 30 is fixed on the cutter base 32. To remove or insert the tool tip 30, it would be enough only to loosen the bolt 34 slightly.

Figure 8:
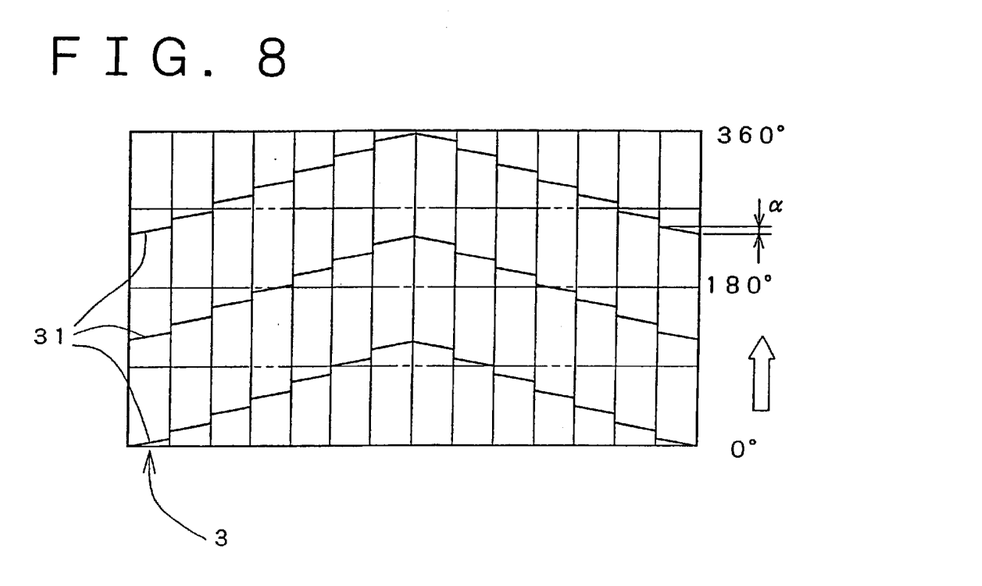
FIG. 8 is a diagram showing an example of arrangement of the blade edge as an entire rotary blade.

Several rotary blades thus formed are overlapped through the main shaft 13, and the entire rotary blade is formed. The edges 31 of the adjacent rotary blades 3 are arranged by slightly deviating from each other. FIG. 8 shows an example of the arrangement of the edges 31 of the entire rotary blades. Each of the blade edges 31 is tilted at an angle equal to the twist angle $\alpha$, and crushing is smoothly performed from the end toward the center so that tire chips are not pushed toward the end of the casing 2.

Figure 3A:
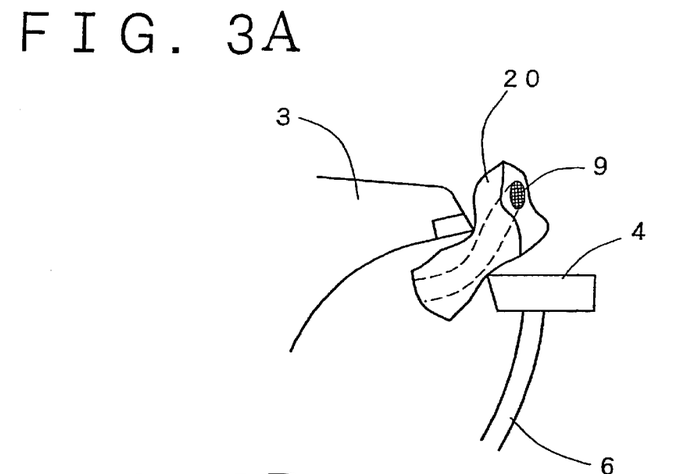
FIGS. 3A, 3B and 3C each represents a side view showing stepwise the principle of crushing waste tire chips by the crushing method of the present invention.
Figure 3B:
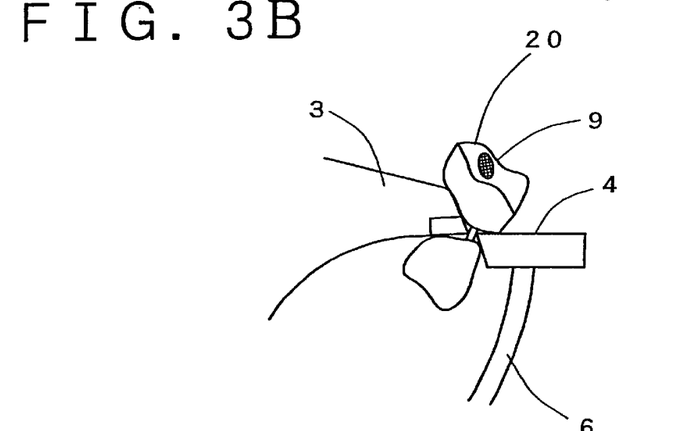
Figure 3C:
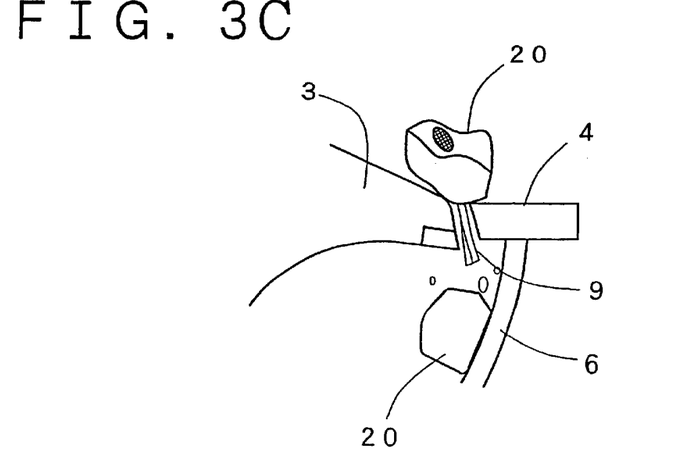

In the above, an essential portion of the crushing apparatus has been described. In this apparatus, waste tire chips coarsely crushed to pieces each in size of 10 cm are charged into the hopper. While the tire chips are mixed and stirred up by the rotary blades 3 within the casing, the chips are crushed by the action of the rotary blades and the fixed blades 4. This action is sequentially and schematically illustrated stepwise in FIGS. 3A, 3B and 3C. The rotary blades 3 are rotated at a rate of about 400 rpm. When a waste tire chip 20 comprising bundles of piano wires 9 is caught between the edges of the rotary blades and the fixed blades, the tire chip 20 is tightly compressed by the edges and it is ruptured at the portion caught between the edges. The bundles of the piano wires 9 are also compressed. Because there is a gap larger than the diameter of the piano wire 9 between the edges, the piano wire is not cut off but it is forcibly pushed into the gap. When the rotary blades are rotated further, the rubber piece pulled by the edges of the rotary blades and ruptured is withdrawn and separated from the piano wire. When the tire chip contains steel belt, the same action occurs, and only the rubber pieces are ruptured, and the steel belt is ruptured and separated to each steel fiber. It appears that the crushing operation is achieved by the above action, but other actions may take place at the same time. For example, the surface of the tire chips may be scraped by the fixed blades, or rubber pieces caught in the punching holes of the filter may be scraped or chipped by the rotary blades. The temperature inside the casing may be increased to 50° C.–60° C. due to friction heat. This facilitates the withdrawal of piano wires or steel fibers from the rubber pieces, and crushing and separation are performed within short time. Fine rubber powders and chips in size of several millimeters are collected and received in a collection box 8 or on a belt conveyor 46 together with the withdrawn piano wires and steel fibers after passing through the above process.

Industrial Applicability

As described above, according to the method for crushing waste tires of the present invention, only rubber components are crushed while piano wires and steel fibers are withdrawn by the rotary blades and the fixed blades which maintain gaps between the blade edges and without cutting or rupturing these wires and fibers. As a result, iron components can be completely removed by a single magnetic separation process after the crushing operation. Therefore, the process to produce rubber powder can be extensively simplified, and this leads to considerable reduction of the cost to produce rubber powder. This would facilitate the material recycling of the waste tires to a great extent.

According to the present invention, the rotary blades and the fixed blades of the crushing apparatus do not cut piano wires and steel fibers. This results in less wearing of blade edges, and there is no need to frequently replace the blades as in the conventional type pulverizer or crusher. Rather, there is such unexpected effect that the blades can crush and pulverize the tire chips even better when the blade edges are worn out.

When the tire chips are caught between the fixed blades and the rotary blades, edges of the rotary blades are applied in oblique direction, and the tire chips can be smoothly ruptured only by applying a slight force. As a result, wearing of the edges advances more slowly and shocks are decreased, and this leads to lower noise. To fix the tool chip on the blade edges, bearing pressure of the holding piece designed in wedge-like shape is utilized. This contributes to the simplification of the shape of the tool tip and to further reduction of the cost.

Also, this makes replacement of the tool tip much easier.

The replacement of the filter (corresponding to a screen in a conventional type crusher), which had required much time in the past, can be accomplished within 10 minutes. When several different types of filters with punching holes of different sizes are prepared, filters can be replaced to suit the particle size of rubber pieces each time, and it is possible to easily produce rubber powder of almost uniform particle size suitable for recycling.

The present invention is intended for the crushing of waste tires, while it is also possible to use the invention for other purposes. For example, the invention can be used for the crushing of composite materials, for which crushing has been difficult to perform in the past, for instance, rubber hose with iron wires, resin fibers etc. buried in it.

What is claimed is:

1. An apparatus for crushing waste tires, comprising:
    a casing communicating with a hopper, said casing having a filter with holes at its lower portion;
    one or more fixed blades fixed to said casing in such a manner that the tip of said fixed blade projects into a space defined by said casing;
    a rotary shaft rotatably supported horizontally at an approximately central position in said casing; and
    a plurality of rotary blades fixed to said rotary shaft so that said rotary blades can rotate, each of said rotary blades including a cutter base, a plurality of tool tips fixed to said cutter base by way of a plurality of holding pieces, each of said tool tips and said holding pieces being received in a recess provided in said cutter base, each of said holding pieces being designed in wedge-like shape with trapezoidal cross-section, said fixed blades being fixed at such a position so that a gap is created between an edge of each of said fixed blades and an edge of a correspondingly positioned passing rotary blade, said gap being slightly larger than diameter of a piano wire contained in the tire so as to sandwich said waste tires between said fixed blades and said rotary blades.

2. The apparatus for crushing waste tires as claimed in claim 1, wherein said edge of each of said tool tips is oriented in a direction slightly deviated from an axial direction of said rotary shaft.

3. The apparatus for crushing waste tires as claimed in claim 1, wherein said edges of said tool tips of said plurality of said rotary blades are arranged in an axial direction such that each edge is shifted from a tangential position of an adjacent edge.

4. The apparatus for crushing waste tires as claimed in claim 1, wherein said filter is designed in a curved shape along edges of the rotary blades and placed on a lower surface of the casing.

5. The apparatus for crushing waste tires as claimed in claim 1, wherein said filter is supported by a pair of clamp arms opened in a downward direction by cylinders from a lower side, a carriage moving along two rails provided in a lower portion of the casing, the carriage including a chute for directing crushed materials falling from the filter to a point for subsequent processing, a lifter for receiving the filter turned to a free state and for moving the filter up and down, and said chute and said lifter being arranged at aligned positions.

6. A method for crushing waste tires, comprising the steps of:
    positioning monoaxial rotary blades within a casing;
    positioning opposing fixed blades within the casing;
    creating a gap between each fixed blade and a rotary blade as it passes the fixed blade, the gap being slightly larger than the diameter of a piano wire contained in the tires;
    catching and sandwiching waste tire chips in the gaps between the fixed and rotary blades;
    rupturing only rubber components without cutting the piano wires and steel fibers in the tires;
    tearing and separating the rubber components by rotation of the rotary blades;
    and crushing the tires while separating the rubber components from the piano wires and steel fibers.

* * * * *